United States Patent [19]

Arakawa

[11] Patent Number: 5,242,230
[45] Date of Patent: Sep. 7, 1993

[54] FONT CARTRIDGE WITH THERMAL CORRECTION INFORMATION

[75] Inventor: Junichi Arakawa, Yokohama, Japan

[73] Assignee: Canon Kabushiki Kaisha, Tokyo, Japan

[21] Appl. No.: 887,389

[22] Filed: May 21, 1992

Related U.S. Application Data

[63] Continuation of Ser. No. 533,950, Jun. 6, 1990, abandoned, which is a continuation of Ser. No. 213,840, Jun. 30, 1988, abandoned.

[30] Foreign Application Priority Data

Jul. 6, 1987 [JP] Japan .................. 62-166944

[51] Int. Cl.$^5$ .................. B41J 2/36
[52] U.S. Cl. .................. 400/120; 346/76 PH; 400/692
[58] Field of Search .................. 400/120, 692; 346/76 PH

[56] References Cited

U.S. PATENT DOCUMENTS

| | | | |
|---|---|---|---|
| 3,964,591 | 6/1976 | Hill et al. | 400/126 |
| 4,386,862 | 6/1983 | Kittel et al. | 400/175 |
| 4,660,998 | 4/1987 | Tsuneki | 400/61 |
| 4,660,999 | 4/1987 | Tsuneki | 400/692 X |
| 4,782,351 | 11/1988 | Miura | 346/76 PH X |
| 4,801,948 | 1/1989 | Kato | 346/76 PH |

FOREIGN PATENT DOCUMENTS

| | | | |
|---|---|---|---|
| 0012806 | 9/1980 | European Pat. Off. | 400/121 |
| 0181949 | 5/1986 | European Pat. Off. | 400/692 |
| 2588212 | 10/1986 | France | 400/121 |
| 115869 | 7/1984 | Japan | 400/692 |
| 127361 | 6/1986 | Japan | 400/692 |
| 222763 | 10/1986 | Japan | 400/692 |
| 2161005 | 1/1986 | United Kingdom | 400/121 |
| 2182471 | 5/1987 | United Kingdom | 400/121 |

*Primary Examiner*—David A. Wiecking
*Assistant Examiner*—Steven S. Kelley
*Attorney, Agent, or Firm*—Fitzpatrick, Cella, Harper & Scinto

[57] ABSTRACT

A font cartridge which can be attached to and detached from a printer and has an ROM to store the character font pattern corresponding to the type style to be output in accordance with a print request from the printer. The ROM stores the print correction information corresponding to the character font pattern according to a predetermined type style which is read out of the ROM in response to the print request from the printer. The ROM also stores the storage management address information of the print correction information corresponding to the character font pattern. With this font cartridge, a high quality print character subjected to the print correction peculiar to each type style can be output for every type style.

7 Claims, 4 Drawing Sheets

FONT CARTRIDGE WITH THERMAL CORRECTION INFORMATION

This application is a continuation of application Ser. No. 07/533,950 filed Jun. 6, 1990, now abandoned, which in turn is a continuation application of Ser. No. 07/213,840 filed Jun. 30, 1988, now abandoned.

BACKGROUND OF THE INVENTION

1. Field of the Invention

The present invention relates to a character font memory to store character font patterns and, more particularly, to a font cartridge which has a character font memory therein which can be attached to and detached from a printer.

2. Related Background Art

Hitherto, in an electronic apparatus, e.g., a word processor with a printer to which a font cartridge can be attached, when print data consisting of a character code train is input, the character codes in the print data are interpreted. The font memory, which is provided in the apparatus and into which the character font pattern corresponding to the character codes is stored, is accessed. A desired font pattern is transferred to the printing unit and printed.

On the other hand, there have been also proposed various kinds of apparatuses in which in order to print the print data with a desired font type in accordance with a variety of the font patterns for printing, the font patterns corresponding to the type style are previously stored into a plurality of font cartridges, the font pattern of a desired arbitrary type style is read out of those font cartridges in correspondence to the character codes and the printing process is executed.

However, in the head unit of the recording apparatus for printing the readout font pattern, for example, in the thermal head, bubble jet head, or the like, in order make the characters to be printed uniform, in general a heat generating amount is corrected on the basis of the type style of the characters to be printed by reference to a correction table in which the heat generating amounts are previously stored and, thereafter, the characters are printed.

Such a kind of correction table is held in a special area in a memory on the control side to control the recording apparatus and is commonly used. Therefore, in the recording apparatus which can print the character font patterns of a plurality of kinds of type styles which are read out of a plurality of font cartridges, an extremely large memory area for the correction table is needed. There is a problem that the memory areas necessary for the other controls which are inherently needed for printing are also partially occupied by such a large memory area for the correction table, so that the printing process control efficiency is remarkably obstructed.

SUMMARY OF THE INVENTION

The present invention is made to solve the foregoing problems and it is an object of the invention to provide a font cartridge in which print correction tables corresponding to the print font patterns, which are peculiar to the type styles which are stored in font cartridges which can be attached to and detached from a recording apparatus are respectively stored in the font cartridges. This reduces the degree of memory capacity of a control memory on the side of the recording apparatus occupied by the memory area for the correction tables and makes it possible to always output print characters of a high quality according to each type style which are subjected to the print correction peculiar to each type style.

DETAILED DESCRIPTION OF PREFERRED EMBODIMENT

Figure 1:
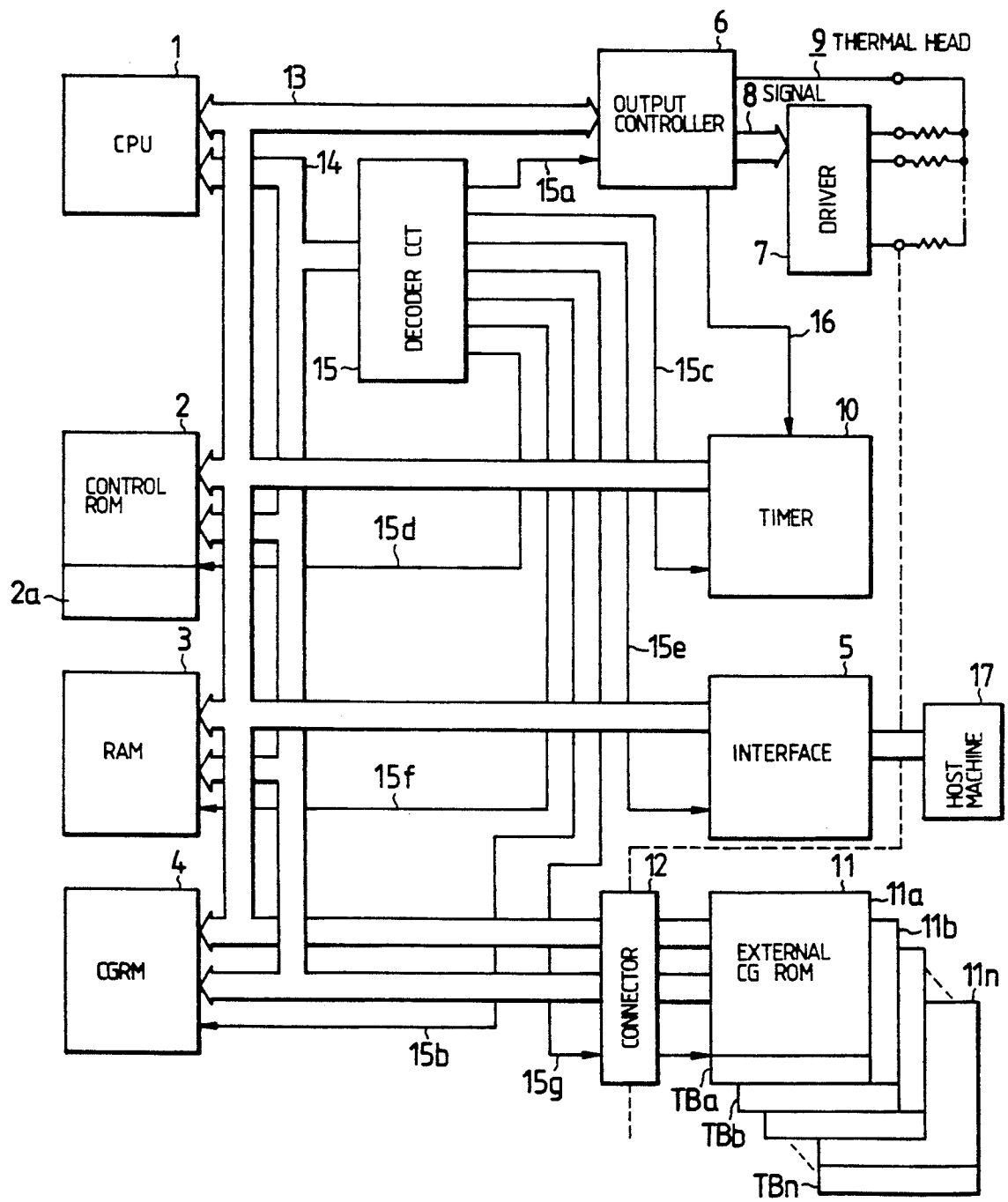
FIG. 1 is a block diagram illustrating an arrangement of a recording apparatus to and from which a font cartridge can be attached and detached according to an embodiment of the present invention.

FIG. 1 is a block diagram for explaining an arrangement of a recording apparatus to which a font cartridge can be attached or from which a font cartridge can be detached according to an embodiment of the present invention. Reference numeral 1 denotes a CPU for executing various kinds of arithmetic operations and logic discriminating processes on the basis of control programs (including flowcharts which will be explained hereinlater) stored in a control ROM 2, thereby integrally controlling each section. The control ROM 2 has therein a correction table 2a to store print correction data for the character font patterns which are stored in a character generator ROM (CGROM) 4 provided in the apparatus. An RAM 3 functions as a work memory of the CPU 1 and temporarily stores, for example, recording data. An interface circuit 5 receives the data from a host machine 17. An output controller 6 transfers the recording data to a head driver (driver) 7 through a signal line 8 and controls a pulse width voltage to drive a thermal head 9. A timer circuit 10 gives a recording timing or recording pulse width 16 to the output controller 6. Reference numeral 11 denotes an external CGROM group as font cartridges. This diagram shows the case where external CGROMs 11a to 11n can be used for every type style. The external CGROMs 11a to 11n corresponding to the respective type styles have correction tables $TB_a$ to $TB_n$ to store correction information necessary to print the character font patterns for the different type styles. The detachable external CGROMs 11a to 11n for the type styles are connected to a recording apparatus (a group of devices on the left side when a broken line in the diagram is used as a boundary line) by a connector 12. The font patterns of the respective characters which are stored in the external CGROMs 11a to 11n and the correction information necessary to print the character font patterns for the type styles are read out in accordance with addresses from the CPU 1. Reference numeral 13 denotes a data bus; 14 denotes an address bus; and 15 denotes a decoder circuit. With reference to the address information on the address bus 14 connected to the CPU 1, the decoder circuit 15 generates: a decoder output 15a to enable the output controller 6; a decoder output 15b to enable the CGROM 4; a decoder output 15c to enable the timer circuit 10; a decoder output 15d to enable the control ROM 2; a decoder output 15e to enable the interface circuit 5; a decoder output 15f to enable the RAM 3; a decoder output 15g to enable the external CGROMs 11a to 11n; and the like.

Figure 2:
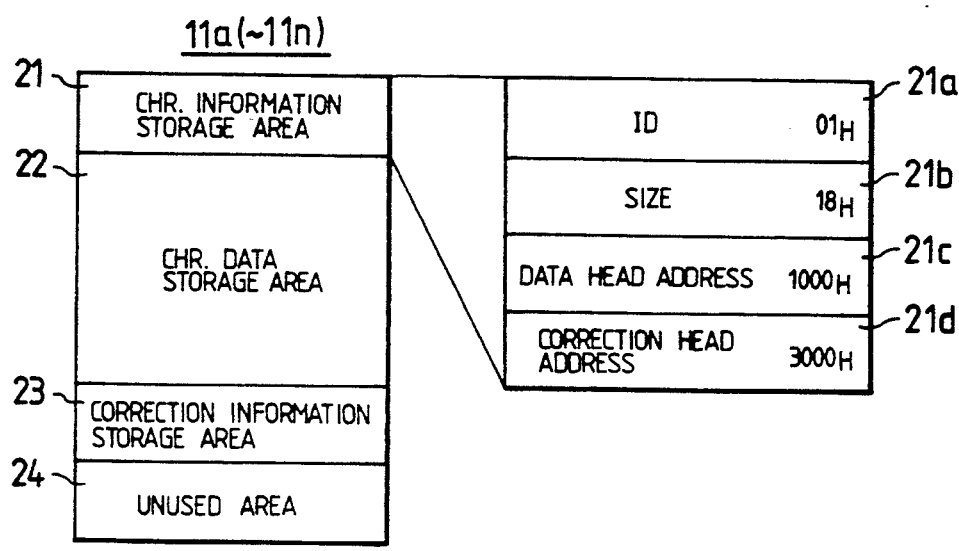
FIG. 2 is a diagram illustrating a memory map in an external CGROM shown in FIG. 1.

FIG. 2 is a diagram for explaining a memory map of the external CGROMs 11a to 11n shown in FIG. 1. Reference numeral 21 denotes a character information storage area. In this area, there are previously written: identification (ID) information 21a of the character type (type style), e.g., "$01_H$"; character size information 21b indicative of the number of data necessary to constitute one character, e.g., "$18_H$"; a head address 21c in a character data storage area 22, e.g., "$1000_H$"; a head address 21d in a correction information storage area 23, e.g., "$3000_H$"; and the like. Reference numeral 24 represents an unused area.

The operation of the apparatus will now be described.

When the print data and control data which are generated from the host machine 17 are received by the interface circuit 5, the CPU 1 reads out the character font pattern corresponding to the print data from the CGROM 4 or external CGROM 11 in accordance with the program stored in the control ROM 2 and temporarily stores it in the RAM 3.

When the print data of one line are stored in the RAM 3 or when a recording start instruction from the host machine 17 is received, the CPU 1 outputs the stored print font pattern data stored in the RAM 3 to the output controller 6 through the data bus 13. At the same time, the CPU 1 sets the recording period and recording pulse width in the timer circuit 10 (in the case of the CGROM 4, the correction information which is stored in the correction table 2a in the control ROM 2 is set; in the case of the external CGROMs 11a to 11n, the correction information which are stored in the correction tables $TB_a$ to $TB_n$ in the external CGROMs 11a to 11n are set). Thus, the recording pulse width control signal 16 is sent from the timer circuit 10 to the output controller 6. In response to this signal, the driver 7 is driven and the thermal head 9 is energized. The ink agent of the ink ribbon is coated onto a recording sheet (not shown). Thus, a character of a predetermined type style is printed and recorded.

In the case of using the font provided in the apparatus, the recording pulse width is output to the timer circuit 10 for every bit with reference to the correction table 2a stored in the control ROM 2 in accordance with the ambient atmosphere temperature, the number of pattern data is transmitted to the head, and the applied voltage is applied to the head.

On the other hand, when an external font is selected, in other words, when either one of the external CGROMs 11a to 11n is connected to the connector 12, the CPU 1 checks to see if the font cartridge which is set at present is the cartridge which has been designated by a command from the host machine 17 or by an operation panel (not shown) (which is provided in the recording apparatus main unit) by discriminating the ID information 21a (e.g., "$01_H$") stored in the character information storage area 21. If it is determined that the present font cartridge coincides with the designated font cartridge, the data corresponding to the character code from the host machine 17 is read out from either one of the external CGROMs 11a to 11n with reference to the character size information 21b (e.g., "$18_H$") and head address 21c (e.g., "$1000_H$") of the character font data.

The readout data is then written into the RAM 3 serving as a readout buffer memory. In the case of subsequently printing the data, the recording heat width is determined on the basis of the correction information which is stored into either one of the correction tables $TB_a$ to $TB_n$ after the head address 21b (e.g., "$3000_H$") in the correction information storage area 23. The value of the decided recording heat width is sent to the timer circuit 10. Thus, the optimum heating time is set in the output controller 6 and driver 7 and the data is printed and recorded by the thermal head 9.

The printing control operation according to the invention will now be described with reference to FIG. 3.

Figure 3:
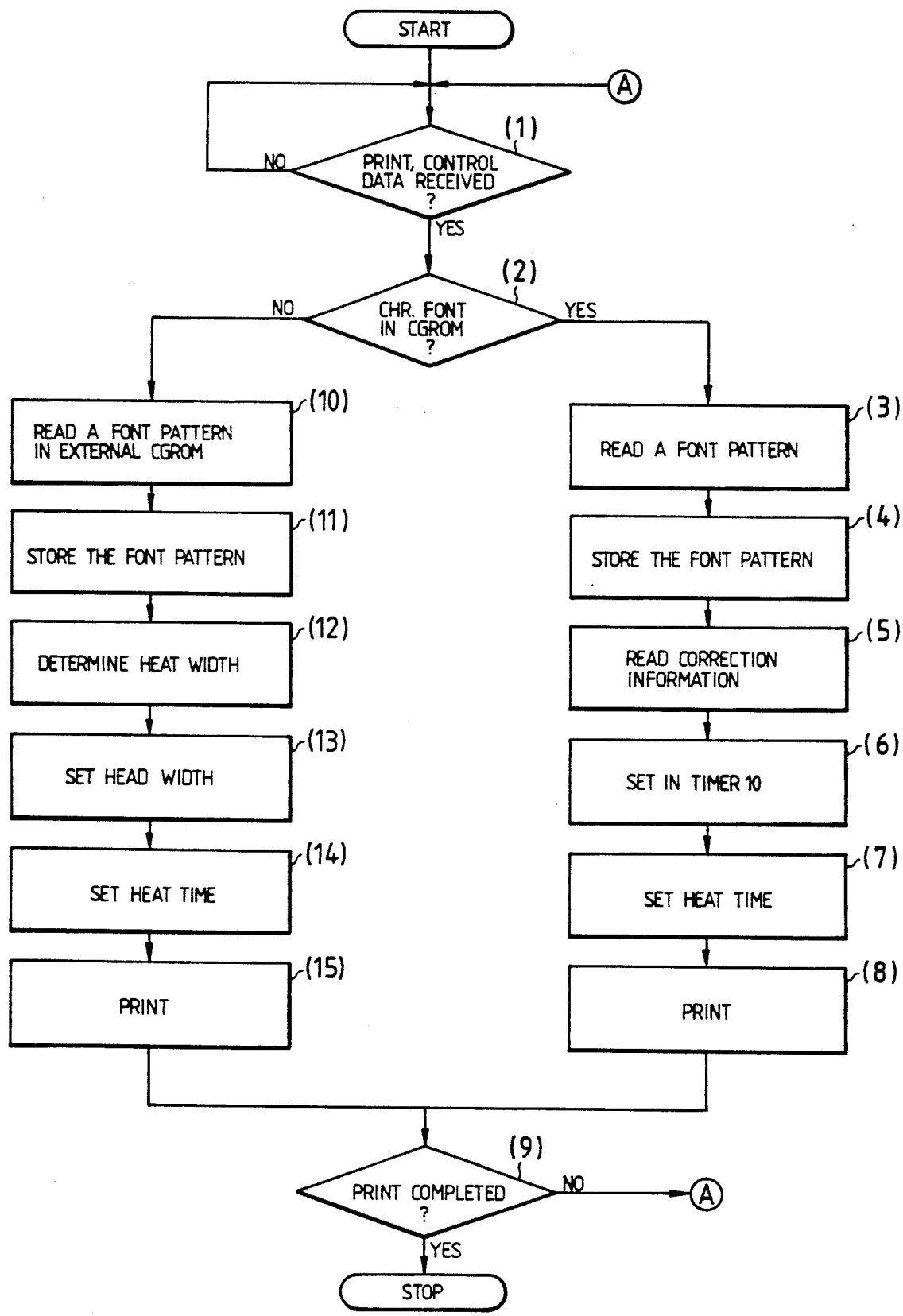
FIG. 3 is a flowchart for explaining a print control procedure according to the invention.

FIG. 3 is a flowchart for explaining a printing control procedure according to the invention. Reference numerals (1) to (15) represent processing steps, respectively.

First, a check is made in step (1) to see if the print data and control data from the host machine 17 have been received or not. If YES, a check is made by reference to the ID information 21a to see if the character font for the received print data corresponds to the print font pattern to be stored in the CGROM 4 or not in step (2). If YES in step (2), the font pattern corresponding to the print character is read out of the CGROM 4 in step (3) and stored in the RAM 3 in step (4). Next, the correction information such as recording heat width and the like for the character font stored in the RAM 3 is read out of the correction table 2a in the control ROM 2 in step (5) and set in the timer circuit 10 in step (6). Subsequently, the optimum heat time is set in the output controller 6 and driver 7 in step (7). The recording and printing are executed by the thermal head 9 in step (8).

In the next step (9), a check is made to see if the data has been completely printed or not. If NO, the processing routine is returned to step (1). If YES, the print control is finished.

On the other hand, if NO in step (2), the font pattern corresponding to the print character is read out from the external CGROMs 11a to 11n in step (10) and stored in the RAM 3 in step (11). The recording heat width is determined in step (12) on the basis of the correction information which is stored in the correction tables $TB_a$ to $TB_n$ in the external CGROMs 11a to 11n. The decided recording heat width is set in the timer circuit 10 in step (13). Subsequently, the optical heat time is set in the output controller 6 and driver 7 in step (14). The recording and printing are executed by the thermal head 9 in step (15). The processing routine is then returned to step (9).

Figure 4A:
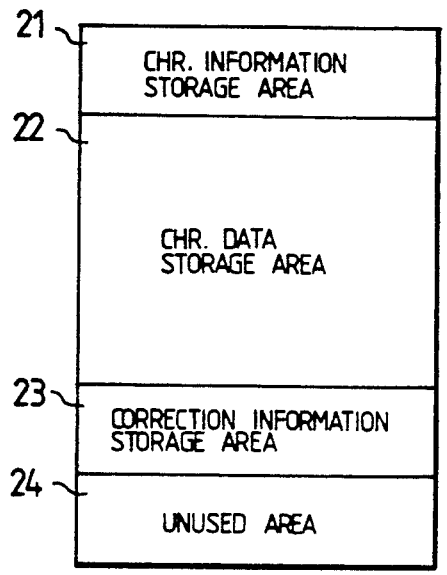
FIGS. 4A to 4C are block diagrams illustrating other memory maps in the external CGROM shown in FIG. 1.
Figure 4B:
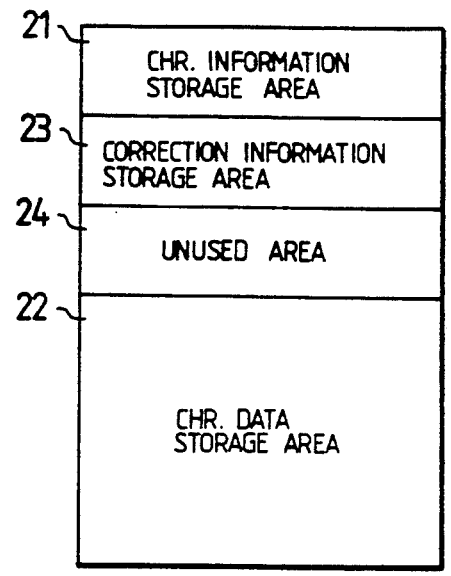
Figure 4C:
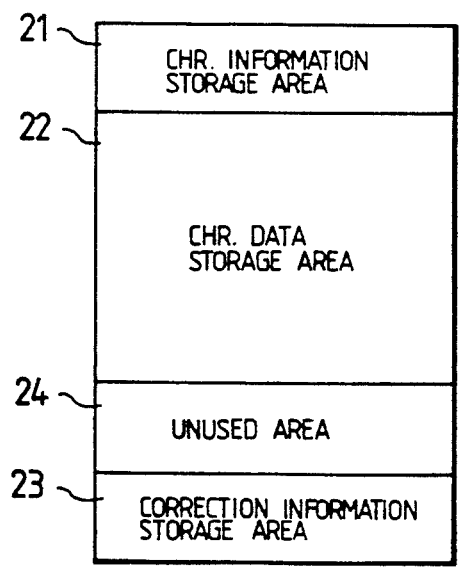

In the foregoing embodiment, the correction tables $TB_a$ to $TB_n$ of the external CGROMs 11a to 11n have been discussed with respect to the case where the head address 21d in the correction information storage area 23 which is stored into the character information storage area 21 is set to the fixed value of, e.g., "$3000_H$". However, as shown in FIGS. 4A to 4C. the correction information storage area 23 can be also constituted so as to be arranged from an arbitrary address. In this case, the storage address is set in the head address 21d which is stored in the character information storage area 21.

The above embodiment has been described with respect to the case where one correction information storage area 23 is assigned for each of the external CGROMs 11a to 11n. However, as shown in FIG. 5, the invention can be also applied to the case where a plurality of, e.g., two correction information storage area, are provided for one external CGROM 11a.

Figure 5:
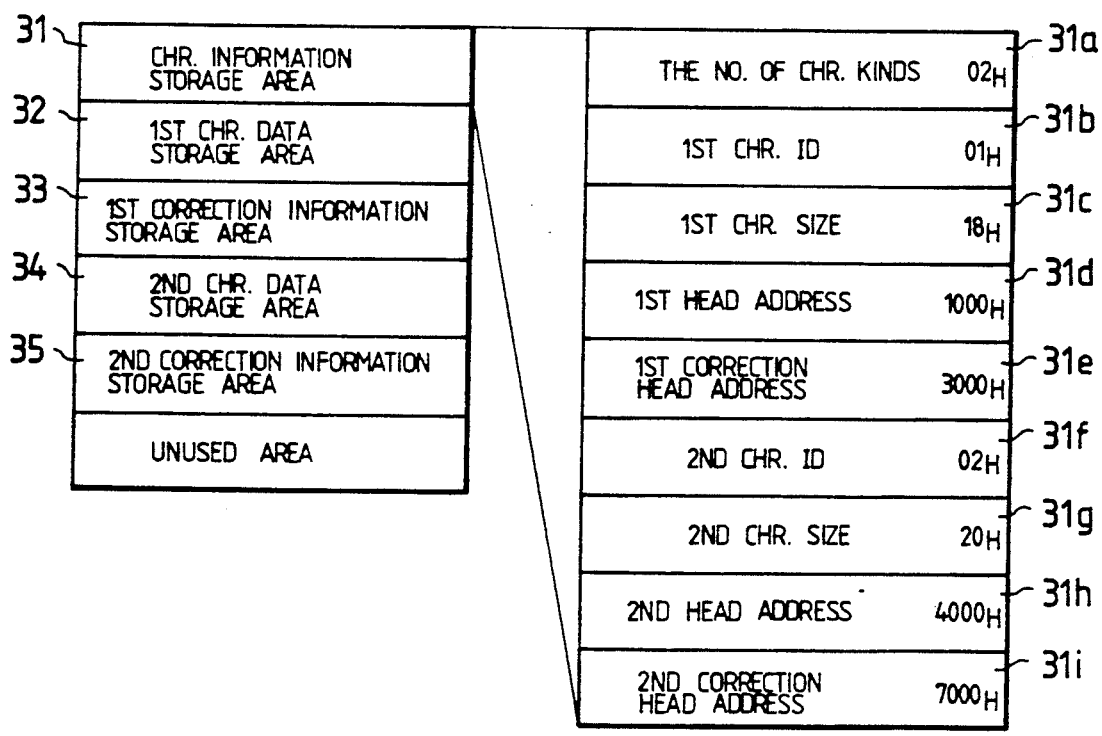
FIG. 5 is a block diagram for illustrating an arrangement for correcting information storage areas which are stored in the external CGROM shown in FIG. 1.

FIG. 5 is a block diagram for explaining an arrangement of the correction information storage area which are stored in the external CGROM shown in FIG. 1. Reference numeral 31 denotes a character information storage area having: the number of kinds of character information 31a; a first ID information area 31b; a first character size information area 31c; a first head address area 31d; a first correction information area 31e; a second ID information area 31f; a second character size information area 31g; a second head address area 31h; a second correction information area 31i; and the like.

Reference numeral 32 denotes a first character data storage area in which the first character font pattern is stored. Reference numeral 33 denotes a first correction information storage area which is designated by the first head address area 31d. The correction information of the character font pattern stored in the first character data storage area 32 is stored in the area 33. A second character data storage area 34 stores the second character font pattern. A second correction information storage area 35 is designated by the second head address area 31h and stores the correction information of the character font pattern stored in the second character data storage area 34.

As described above, according to the invention, the print correction information for each character font pattern based on a predetermined type style which is read out of the storage medium in accordance with a print request from the recording apparatus is arranged in a predetermined area of the storage medium. Therefore, the correction information which is necessary when printing the character font pattern for an arbitrary type style which is read out of a plurality of font cartridges does not need to be provided on the recording apparatus side. Therefore, the control load on the recording apparatus side can be remarkably reduced, the correction information storage area which has conventionally been needed on the side of the main unit is released from the recording apparatus side, and the high quality print character which was subjected to the print correction peculiar to each type style can be always output for every type style.

I claim:

1. A recording apparatus adapted to be used with a font cartridge which has a storage medium for storing a font pattern to be output in accordance with a print request from said recording apparatus, said recording apparatus comprising:
    a recording head for recording via thermal energy;
    a first memory for storing a font pattern other than the font pattern stored in the storage medium;
    a second memory for storing heat-time information representing thermal energy to be supplied to said recording head for each font pattern stored in the storage medium and said first memory;
    determining means for determining whether a font pattern to be output in accordance with the print request exists in the storage medium; and
    means, responsive to a determination by said determining means, for reading out the heat-time information from said second memory for correcting thermal energy to be supplied to said recording head based on the read heat-time information for each font pattern stored in the storage medium.

2. A recording apparatus according to claim 1, wherein said storage medium also stores storage management address information of the print correction information corresponding to the font pattern.

3. A recording apparatus according to claim 1, wherein said storage medium comprises a read only memory (ROM).

4. An output device adapted to be used with a font cartridge which has a storage medium for storing a font pattern to be output in accordance with an output request from said output device, said output device comprising:
    a first memory for storing a font pattern other than the font pattern stored in the storage medium;
    a second memory for storing control information for controlling the output of each font pattern stored in the storage medium and said first memory;
    checking means for checking whether a font pattern to be output in accordance with the print request exists in the storage medium; and
    means, responsive to the checking by said checking means, for reading out the control information from said second memory for correcting the output of the font pattern based on the read control information for each font pattern stored in the storage medium.

5. An output device according to claim 4, wherein said storage medium also stores storage management address information of the output correction information corresponding to the font pattern.

6. An output device according to claim 4, wherein said storage medium comprises a read only memory (ROM).

7. A recording apparatus comprising:
    a recording head for recording via thermal energy;
    first memory means for storing a font pattern;
    second memory means for storing heat-time information representing thermal energy to be supplied to said recording head for each font pattern stored in said first memory means;
    third memory means for storing a font pattern other than the font pattern stored in said first memory means and for storing heat-time information representing thermal energy to be supplied to said recording head;
    checking means for checking whether a font pattern to be output exists in said first memory means or said third memory means; and
    means, responsive to a checking by said checking means, for reading out the heat-time information from said third memory means for correcting thermal energy to be supplied to said recording head based on the read heat-time information for each font pattern stored in said third memory means.

* * * * *